United States Patent [19]

Hayden et al.

[11] Patent Number: 5,032,315

[45] Date of Patent: Jul. 16, 1991

[54] PHOSPHATE GLASS USEFUL IN HIGH POWER LASERS

[75] Inventors: Joseph S. Hayden, South Abington Township; Julia M. Ward, Hollidaysburg, both of Pa.

[73] Assignee: Schott Glass Technologies, Inc., Duryea, Pa.

[21] Appl. No.: 353,835

[22] Filed: May 18, 1989

Related U.S. Application Data

[63] Continuation-in-part of Ser. No. 331,782, Apr. 3, 1989, Pat. No. 4,929,387, which is a continuation-in-part of Ser. No. 238,437, Aug. 31, 1988, abandoned.

[51] Int. Cl.$^5$ .......................... C03C 3/16; C03C 3/19; C03C 3/17; C03C 3/062
[52] U.S. Cl. ...................... 252/301.4 P; 252/301.6 P; 501/37; 501/45; 501/47; 501/48; 501/73; 501/78
[58] Field of Search ................... 252/301.4 P, 301.6 P; 501/45, 47, 48, 73, 78, 37

[56] References Cited

U.S. PATENT DOCUMENTS

| | | | |
|---|---|---|---|
| 3,580,859 | 5/1971 | Buzhinsky et al. | 252/301.1 |
| 3,846,142 | 11/1974 | Mikhailovich et al. | 106/47 R |
| 3,979,322 | 9/1976 | Alexeev et al. | 252/301.6 P |
| 4,022,707 | 5/1977 | Deutschbein et al. | 252/301.6 P |
| 4,075,120 | 2/1978 | Myers et al. | 252/301.4 P |
| 4,076,541 | 2/1978 | Rapp | 106/47 Q |
| 4,120,814 | 10/1978 | Izumitani et al. | 252/301.4 P |
| 4,225,459 | 9/1980 | Faulstich et al. | 252/301.4 P |
| 4,239,645 | 12/1980 | Izumitani et al. | 252/301.4 P |
| 4,248,732 | 2/1981 | Myers et al. | 252/301.6 P |
| 4,333,848 | 6/1982 | Myers et al. | 252/301.4 P |
| 4,470,922 | 9/1984 | Denker et al. | 252/301.4 P |
| 4,661,284 | 4/1987 | Cook et al. | 252/301.4 P |

FOREIGN PATENT DOCUMENTS

| | | |
|---|---|---|
| 3340968 | 5/1984 | Fed. Rep. of Germany . |
| 3435133 | 4/1985 | Fed. Rep. of Germany . |
| 3609247 | 9/1986 | Fed. Rep. of Germany . |
| 49-114615 | 11/1974 | Japan . |
| 50-3411 | 1/1975 | Japan . |
| 51-30812 | 3/1976 | Japan . |
| 51-59911 | 5/1976 | Japan . |
| 52-125519 | 10/1977 | Japan . |
| 60-191029 | 9/1985 | Japan . |
| 355916 | 8/1976 | U.S.S.R. . |

*Primary Examiner*—Mark L. Bell
*Attorney, Agent, or Firm*—Millen, White & Zelano

[57] ABSTRACT

A low- or no-silica phosphate glass useful as a high average power laser medium and having a high thermal conductivity, $K_{90°C.} > 0.8$ W/mK, and a low coefficient of thermal expansion, $\alpha_{20°-300°C.} < 90 \times 10^{-7}/°C.$, consisting essentially of (on a batch composition basis):

| | Mole % |
|---|---|
| $P_2O_5$ | 45–70 |
| $Li_2O$ | 0–14 |
| $Na_2O$ | 0–12 |
| $K_2O$ | 0–6 |
| $Al_2O_3$ | 9–15 |
| $Nd_2O_3$ | 0.01–6 |
| $La_2O_3$ | 0–6 |
| $SiO_2$ | 0–8 |
| $B_2O_3$ | 0–8 |
| MgO | 6–30 |
| CaO | 0–15 |
| SrO | 0–9 |
| BaO | 0–9 |
| ZnO | 0–15 |
| $\Sigma$ MgO + $Li_2O$ | 20–30 | whereby said glass has $K_{90°C.} > 0.8$ W/mK and $\alpha_{20°-300°C.} < 90 \times 10^{-7}/°C.$ The $Nd_2O_3$ can be replaced by other lasing species.

30 Claims, 2 Drawing Sheets

PHOSPHATE GLASS USEFUL IN HIGH POWER LASERS

This application is a continuation-in-part of U.S. Ser. No. 07/331,782, filed on Apr. 3, 1989, now U.S. Pat. No. 4,929,387, which is a continuation-in-part of U.S. Ser. No. 07/238,437 of Aug. 31, 1988, now abandoned both of which are entirely incorporated by reference herein.

BACKGROUND OF THE INVENTION

This invention relates to phosphate laser glasses, typically neodymium-doped, having high fracture toughness, good cross section for stimulated emission, and, especially, high thermal conductivity and low thermal expansion, inter alia. in comparison to prior art and commercially available phosphate laser glasses.

The term "laser" refers to the amplification of light by the stimulated emission of radiation. In a laser, a suitable active material, which can be a glass suitably doped with an active atomic species such as neodymium, is placed in a cavity resonator formed by two reflecting, or at least partially reflecting, walls.

Solid state lasers used for the generation of high levels of average power require that the active material possess a large value (e.g., >1) of the thermomechanical figure of merit, FOM, given by:

$$FOM = \frac{SK(1 - \nu)}{\alpha E}$$

where S is the fracture strength; $K_{90^\circ\ C}$, the thermal conductivity; $\nu$, Poisson's ratio; E, Young's modulus; and $\alpha$, the thermal expansion coefficient of the material. The fracture strength is not totally an intrinsic property of the material but also depends on the physical condition of the surface of the material as well as the material's fracture toughness.

The importance of the thermomechanical figure of merit is clear by considering the thermal condition of a solid state laser material used in a high average power application. During operation, the laser material is exposed to intense levels of pump radiation, a fraction of which is converted by the material into laser emission. A portion of this pump radiation is absorbed by the active material itself resulting in an increase of temperature which rapidly is manifested as a drop in laser efficiency, in some cases serious enough to terminate laser action. As a consequence, it is necessary to cool the laser material by passing a liquid or gas over its surfaces; which, in turn, results in a thermal gradient as the internal temperature of the material rises higher than the temperature of its surfaces. The thermal gradient is accompanied by a stress gradient through the laser material which can be high enough to cause fracture of the active material. The thermomechanical figure of merit is proportional to the maximum gradient that the material can tolerate without fracture.

To optimize a glass for high average power application, it is thus necessary to maximize thermal conductivity and minimize the coefficient of thermal expansion, Poisson's ratio, and Young's modulus. An additional benefit of high thermal conductivity is its direct impact on lowering the internal temperature of the laser material. The effect of minimizing this temperature, for a particular level of pumping, is found both in the reduction of the stress gradient within the material and in a drop in the thermal population of the lower lasing level. This reduction in population of the lower lasing level increases the operating efficiency of the laser.

It is important in the field of high average power lasers that the active material also be characterized by high cross section for stimulated emission and long fluorescence lifetime of the excited state involved in the laser transition. Solid state laser materials are also more favorable for application in high average power laser systems if the active material can be produced in large sizes with high optical quality, high optical homogeneity, and in a form free of all inclusions which absorb radiation. The latter could develop into damage sites within the material when the laser is operated at high power levels, leading ultimately to the active element being rendered useless as a laser material. It is further desirable that the glass materials be chemically strengthenable. Of course, it is always necessary that the glass have good manufacturability properties, e.g., devitrification stability.

It is known that phosphate laser glasses have a low threshold value for the laser effect, and phosphate compositions have been commercially available for some time as materials for use in laser systems in large sizes with excellent optical quality and optical homogeneity. The quality of prior-art phosphate laser glasses recently has been extended by the introduction of new manufacturing technology capable of producing these compositions as glasses with levels of optical quality as good as that of previous glasses but which are now free of all absorbing inclusions which could develop into damage sites within the glass.

Nevertheless, a need has remained to further the development of phosphate compositions, e.g., improve even more the already excellent thermomechanical properties of available phosphate laser glasses, thus making available new compositions which are more attractive for use in high average power laser systems and/or which increase the maximum tolerable power levels, while retaining the current state-of-the-art qualities which make doped phosphate glasses so useful as laser media.

Prior art phosphate glasses contain a wide variety of components including, for example, $Al_2O_3$, $SiO_2$, alkali metal oxides ($Na_2O$, $K_2O$, $Li_2O$, especially), alkaline earth metal oxides, etc., in addition to the base component $P_2O_5$. The prior art glasses having the best combination of the important thermal properties of thermal conductivity and coefficient of thermal expansion have typically been those containing necessary amounts of $SiO_2$. See, e.g., DE 3435133, JP 51-107312 and DE 3609247. These glasses typically have relatively low alumina contents.

Other phosphate laser glasses place no special emphasis on $SiO_2$ or even lack it entirely, e.g., U.S. Pat. No. 4,248,732, 4,075,120, 4,239,645, 4,022,707, 4,470,922, JP 51-59911, DE 2924684, and DE 3340968, etc.

Many other laser phosphate publications exist describing a wide variety of glasses such as JP 49-114,615(4), JP 60-191,029(3), JP 51-107,311, JP 50-3,411, JP 51-30,812, SU-355,916, U.S. Pat. No. 4,333,848, U.S. Pat. No. 3,846,142. In these patents, no particular emphasis is placed on alkali metal oxides. Further patents equate all the alkali metals, e.g., U.S. Pat. Nos. 4,248,732, 4,075,120, 4,120,814, 3,979,322, 4,225,459, 3,580,859 and 4,470,922. Others generically imply that lithium oxide, for example, is less preferred than the other alkali metal oxides. Such patents include U.S. Pat. Nos. 4,022,707, 4,076,541, 4,661,284 and 4,333,848. JP 54-38,311 indicates a preference for lithium but in phosphate glasses containing components such as CuO and $V_2O_5$.

Some of these references also incorporate or permit incorporation of MgO into the phosphate glass. See especially DE 3340968 and also some species of DE 3435133, U.S. Pat. No. 4,239,645, DE 3609247, JP 51-107312, JP 52-125519 and JP 49-114615.

SUMMARY OF THE INVENTION

It has now been discovered that phosphate glasses suitable for use in lasers, especially high average power lasers, and having a very desirable combination of thermomechanical properties and other properties such as those mentioned above can be achieved.

Thus, in one aspect, this invention relates to a low- or no-silica phosphate glass useful as a laser medium and having a high thermal conductivity, $K_{90° C} > 0.8$ W/mK, and a low coefficient of thermal expansion, $\alpha_{20°-300° C} < 90 \times 10^{-7}/°C$, consisting essentially of:

|  | Mole % | | |
|---|---|---|---|
|  |  | Preferred | Most Preferred |
| $P_2O_5$ | 45–70 | 50–65 | 55–65 |
| $Li_2O$ | 0–14 | 0–12 | 2–10 |
| $Na_2O$ | 0–12 | 0–5 | 0 |
| $K_2O$ | 0–6 | 0–3 | 0 |
| $Al_2O_3$ | 9–15 | 10–15 | 10–15 |
| $Nd_2O_3$ | 0.01–6 | 0.01–6 | 0.01–6 |
| $La_2O_3$ | 0–6 | 0–6 | 0–6 |
| $SiO_2$ | 0–8 | 0 | 0 |
| $B_2O_3$ | 0–8 | 0–5 | 0 |
| MgO | 6–30 | 8–24 | 10–18 |
| CaO | 0–15 | 0–12 | 0–9 |
| SrO | 0–9 | 0–6 | 0–4 |
| BaO | 0–9 | 0–6 | 0–4 |
| ZnO | 0–15 | 0–12 | 0–9 |
| $\Sigma\ Li_2O + MgO$ | 20–30 | 20–30 | 20–30 | whereby said glass has $K_{90° C} > 0.8$ W/mK and preferably higher and $\alpha_{20-300° C} < 90 \times 10^{-7}/°C$ and preferably lower, and, when used as a laser medium, an amount of a lasing species or lasing system (e.g., a lasing species/energy transfer species combination) effective for lasing, e.g., often 0.01-6 mole % in total, but optionally also higher, e.g., up to 10% or even up to 20% or higher in total, ordinarily Nd ($Nd_2O_3$), as exemplified in the table above. $La_2O_3$ can replace such species especially when they are lanthanides, as also shown in the table above.

In other preferred aspects, $K_{90° C} \geq 0.85$ or higher and $\alpha_{20-300° C} \leq 85$ or lower; the content of MgO is at least 8 mole %; the glass contains essentially no alkali metal oxide other than $Li_2O$ and especially no potassium; and/or the glass contains essentially no $SiO_2$.

In another preferred aspect, the glass also has the following important properties:
Damaging inclusions per liter essentially zero
Strengthenability $\geq 4x$
Young's Modulus (E) $< 72 \times 10^3$ N/mm²
Poisson's Ratio ($\nu$) $< 0.230$
Cross section ($\sigma$) $> 3.5 \times 10^{-20}$ cm²
Fluorescence lifetime (5% Nd) $> 250\ \mu sec$ It is further preferred that these properties exceed even these goals, e.g., $E \leq 70$, sigma $> 3.8$ or 4.0 or 4.1 or 4.2, lifetime $> 270$ or 290 or 300.

Various other objects, features and attendant advantages of the present invention will be more fully appreciated as the same becomes better understood when considered in conjunction with the following discussion and the accompanying drawings wherein.

Figure 1:
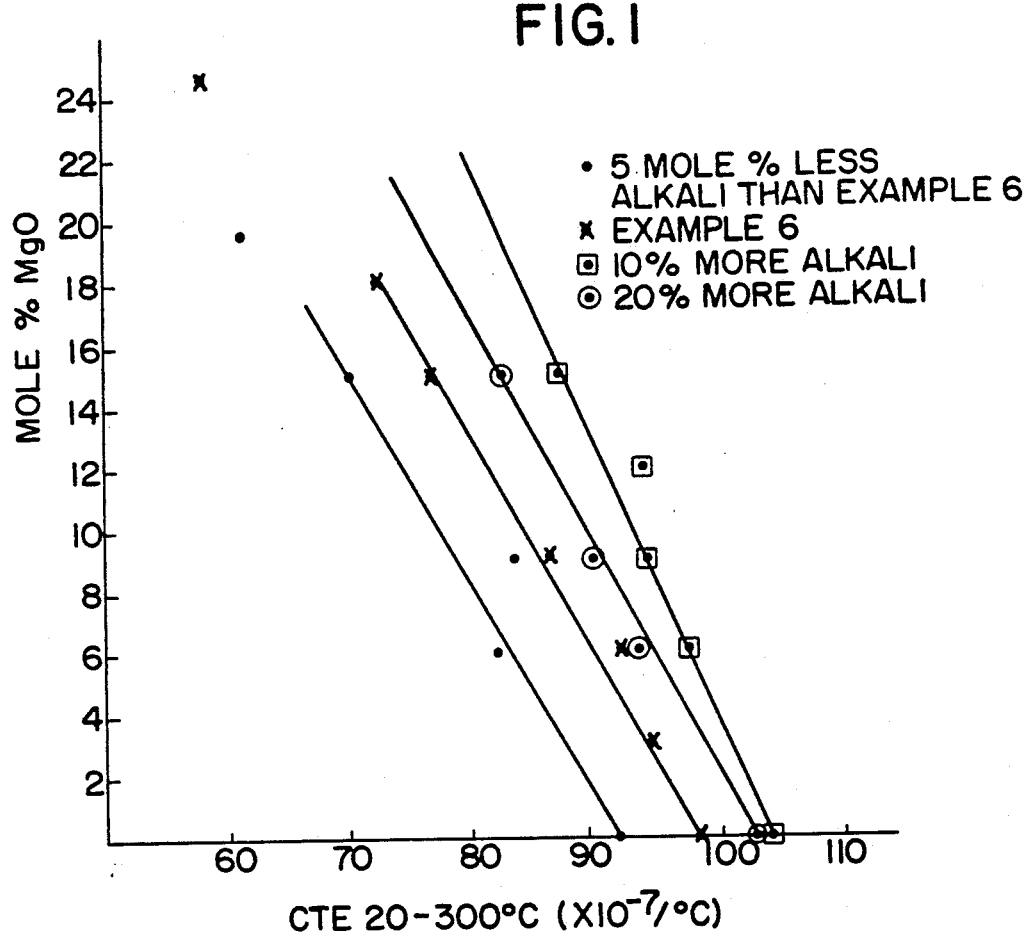
FIG. 1 shows the functional dependence of CTE versus MgO content for varying amounts of alkali content.

Special emphasis in this invention is placed on thermal conductivity $> 0.8$ W/mK and thermal expansion from 20° C to 300° C $< 90 \times 10^{-7}/°C$. The properties of Young's modulus and Poisson's ratio are, in general, not strongly affected by the compositional variations within the scope of this invention. The compositions of the invention further are compatible with current melting technology, thus assuring that the glasses of this invention will be produced with excellent optical and inclusion qualities.

The cross sections for stimulated emission and the fluorescence lifetime of the excited state involved in the laser transition are also superior for the glasses of this invention. The precise values for a given glass, however, are not uniquely critical for application as a high average power laser material. The thermal expansion across the temperature range of 20° C to 40° C, the refractive index at 587.5618 nm, the specific gravity and the glass transformation temperature of the compositions of this invention furthermore are highly satisfactory.

These glass compositions employing $P_2O_5$ as the principal glass former, in comparison to $SiO_2$, also advantageously provide laser glasses characterized by lower nonlinear refractive index, higher laser gain, and a negative or near zero value for the temperature dependence of refractive index. This latter property denotes to the glasses an overall value of temperature coefficient of optical path length near zero. The glasses thus can be described as essentially athermal.

A preferred application of the glasses of this invention is in high average power laser systems. They are especially useful in high average power oscillators in view of their uniquely beneficial combination of thermomechanical properties.

When a glass laser system is operated, much of the energy pumped into the glass shows up as an increase in temperature of the material. This temperature increase, combined with the thermomechanical properties of the glass (and other considerations, such as surface condition) determines the possibility of the glass slab fracturing.

In a high energy laser system (e.g., that of DE 3340968), only the output energy from the system is maximized. In such a system, the number of shots produced in a given amount of time is not important. Therefore, the glass will have enough time to dissipate the thermal energy associated with the laser shot. No heat build-up with continual laser shots will occur which would lead to the glass slab cracking. In this type of system, thermomechanical properties are not as important as the laser properties (sigma and lifetime).

Thermomechanical properties are more important in a high average power laser system. (Typically, "high average power" can be taken to include powers $> 100$ watts for a slab 10 mm thick and a repetition rate of 75

Hz at 530 nm (green). Higher and a little lower powers are also included.) In such a system, the number of shots is maximized and the output energy is maintained as high as possible. With a higher repetition rate, the amount of time the glass has to dissipate the extra thermal energy decreases and the chance of cracking increases. When the thermomechanical properties are improved, the energy needed to crack the glass is higher than previously, so the repetition rate can be increased. Although laser properties are still important, thermomechanical properties are considered first. As a result, the glasses of this invention possess properties making them exceptionally useful for high average power laser oscillators.

The glasses of this invention differ from those of the different inventions of the U.S. patent applications incorporated by reference above, for example, by a mandatory MgO content. The prior glasses contained MgO only optionally. This MgO content alleviates the requirement of these different glasses that a minimum of 15 mole % $Li_2O$ be present. For this invention, as long as MgO is present, $Li_2O$ is present in amounts less than 15 mole %. The total content of MgO+$Li_2O$ is at least 20 mole % and typically less than 30 mole %.

In a preferred aspect, the amount of MgO is greater than the amount of $Li_2O$.

As a result of the use of lower amounts of $Li_2O$, chemical durability is increased, devitrification resistance is increased and thermomechanical properties are improved. Inclusion of $Li_2O$ in amounts up to less than 15 mole %, on the other hand, is desirable in view of increased manufacturability.

The MgO contents of this invention also enhance chemical durability, devitrification resistance and thermomechanical properties, while alleviating the requirement for high $Li_2O$ contents of the incorporated patent applications.

If the amount of MgO is outside the range required by this invention, the properties described herein will be inferior to those otherwise achievable, including those described above, cross-section, etc.

Generally the MgO content range can be defined in terms of 6, 7, 8, 9, 10, 11, 12, 13, 14, 15, 16, 17, 18, 19, 20, 21, 22, 23, 24, 25, 26, 27, 28, 29, 30, etc., mole %. The $Li_2O$ content can be defined in terms of 0, 1, 2, 3, 4, 5, 6, 7, 8, 9, 10, 11, 12, 13, 14, etc., mole %. The sum of the MgO and $Li_2O$ can be defined in terms of 20, 21, 22, 23, 24, 25, 26, 27, 28, 29, 30, etc. Typically, if the sum of MgO+$Li_2O$ is not as stated, the thermomechanical properties will be inferior, as can be seen from the examples below.

Small additions of sodium are generally tolerable in the glasses. The amount of sodium acceptable will vary somewhat as a function of the base composition. Lesser amounts of potassium will also be acceptable in the glasses, in general, less than about, e.g., 6 mole% $K_2O$, as for $Na_2O$, consistent with producing a glass with the mentioned desirable thermomechanical and other properties for high average power applications.

The limits (upper or lower) on $Na_2O$ contents, of course, can also be different from those recited above, e.g., combinations of 12, 11, 10, 9, 8, 7, 6, 5, 4, 3, 2, 1 or 0 mole %. For $K_2O$, combinations of 6, 5, 4, 3, 2, 1 and 0 mole % are also possible. For $Li_2O$, combinations of 0, 1, 2, 3, 4, 5, 6, 7, 8, 9, 10, 11, 12, 13, 14 are also possible.

The nature of the effects of various component oxides on the glass properties of this invention will be analogous to those discussed and demonstrated in the U.S. applications incorporated above. Thus, the entire texts of these applications are incorporated by reference herein.

Although CaO, SrO, BaO and/or ZnO are not required per this invention to produce a glass suitable as a high average power laser material, it is nevertheless desirable to add these oxides to improve the properties of the compositions while still retaining those properties desirable in a high average power laser material. For example, the addition of small amounts of alkaline earth metal oxides improves the chemical durability and imparts to the glass a higher stability against crystallization during manufacturing. Minimum contents for thse RO compounds, as well as those for the other optional components of the glasses of this invention are, e.g., 1, 2, 3, 4, 5 mole %, etc.

$Al_2O_3$ is also a particularly important component. It imparts to the resultant glass better chemical durability. Levels of $Al_2O_3$ higher than 15 mole % tend to have an undesirable effect on cross section. Other limits of $Al_2O_3$ contents are, e.g., 9, 10, 11, 12, 13 or 14 mole %.

The addition of $SiO_2$, while not required, can raise the thermal conductivity of the resultant glass without strongly influencing thermal expansion. However, the addition of $SiO_2$ makes the glass more prone to crystallization and decreases fluorescence lifetime and cross section. Furthermore, the presence of silica in a glass melt is known to lower the solubility of ionic platinum in such melts, leading to incorporation of platinum particles from state-of-the-art melters into the resultant glass. These particles (inclusions) absorb laser radiation and can become damage sites within the element, potentially rendering the material useless as a high quality optical element. Thus, the ability of this invention to achieve its excellent thermal, mechanical and optical properties without necessary $SiO_2$ contents is a major advantage. Other limits of $SiO_2$ contents are, e.g., 7, 6, 5, 4, 3, 2, 1 mole %, etc.

Minor additions of $B_2O_3$ increase slightly the thermal conductivity of the glasses; however, at levels above about 8 mole %, additional $B_2O_3$ results in an unacceptable increase in thermal expansion coefficient. Other limits include 7, 6, 5 mole %, etc.

$Nd_2O_3$, the preferred lasing species is added to the glasses in sufficient quantity to achieve the desired lasing activity as is true for the other lasing species and systems. At too high levels of $Nd_2O_3$ concentration and other species concentration, quenching of the fluorescence emission can occur, and there is a corresponding drop in fluorescence lifetime of the excited state involved in the laser transition. Suitable upper limits in a given case can be routinely determined.

Any conventional glass lasing species can be used, e.g., Nd, Tm, Yb, Dy, Pm, Tb, Er, Ho, Ti, V, Cr, Eu, Sm, etc. In another embodiment of the present invention, the laser compositions can contain suitable codopants along with primary lasing ions. These include transition metals like chromium and vanadium, or lanthanide ions, such as thulium and erbium. These have broad and intense absorption bands and resultant codopant fluorescence bands which overlap with the primary lasing ion absorption levels. See, e.g , *Physics of Laser Fusion*, Volume IV, "The Future Development of High-Power Solid State Laser Systems." This phenomenon leads to a more efficient conversion of pump radiation into the excited state population of lasing ions.

The total amount of these active ions alone or in combination is 0.01-6 mole % typically. However, as noted above, higher amounts can be used where appropriate, e.g., 7, 8, 9, 10, 11, 12, 13, 14, 15, 17, 25 mole %, etc. See Emmett et al., Lawrence Livermore National Laboratory, UCRL-53344, November 1982.

Addition of $La_2O_3$ allows direct substitution of $Nd_2O_3$ or other lasing or energy transfer lanthanide species by another lanthanide oxide, which is nearly an exact structural replacement in the case of $Nd_2O_3$. This allows the manufactured glass to be produced with a broad range of neodymium or other lasing species doping levels while minimizing the change from this adjustment on the physical, thermal, and optical properties of the produced glasses. Thus, $La_2O_3$ amounts typically are 0.01-6 mole %, but higher contents are possible, e.g., up to 10% or even up to 20% as a replacement for lanthanide lasing species.

It is further possible to add small amounts, e.g., 0.1-0.3 wt. %, of conventional refining agents such as $As_2O_3$ and $Sb_2O_3$ to the compositions to aid in manufacturing while not compromising high average power properties. It is additionally possible to add small antisolarization effective amounts, e.g., 0.1-1.5 wt. %, of conventional antisolarants such as $TiO_2$, $CeO_2$ and $Nb_2O_5$ (as well as others, e.g., $SiO_2$ and $Sb_2O_3$) to suppress solarization of these glasses during exposure to intense UV radiation, common during application as an active laser material. It is further possible to omit a lasing species entirely in the glasses, e.g., for their use in other applications, e.g., in optical elements such as lenses, mirrors, etc., where their exceptional properties are beneficial.

A particularly preferred such application is use of the glasses of this invention as a cladding for glass fibers, e.g., analogously to the cladding glasses of U.S. Pat. No. 4,217,382.

Figure 2:
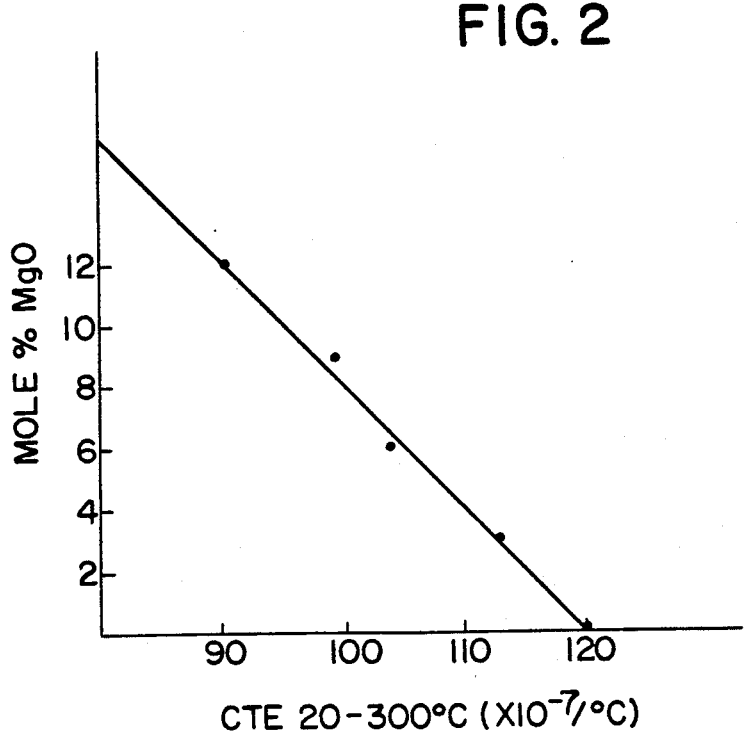
FIG. 2 shows the functional dependence of CTE versus MgO content for the series of Table 5.
Figure 3:
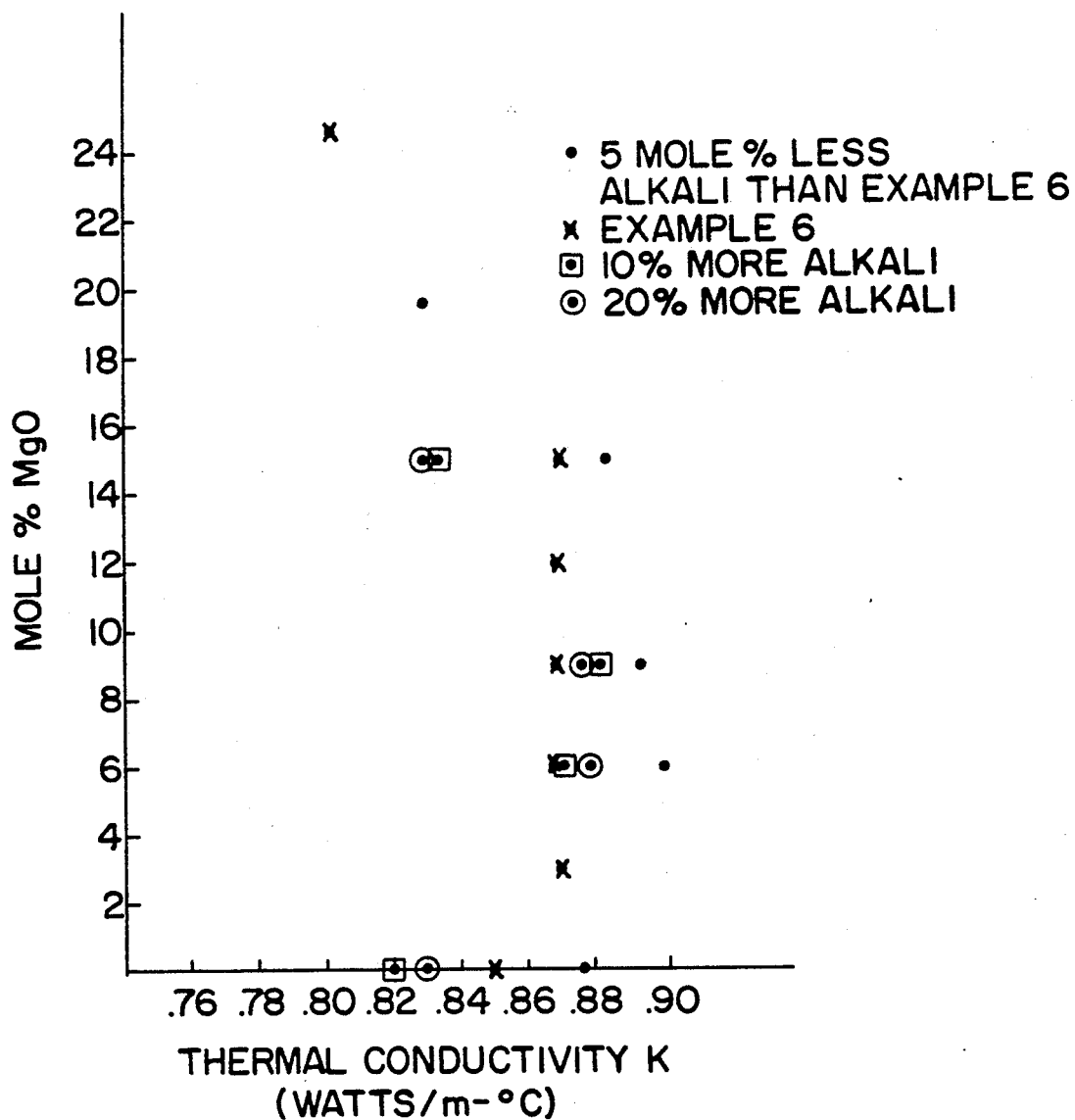
FIG. 3 shows the functional dependence of the thermal conductivity, $K_{90° C}$, versus MgO content for varying amounts of alkali content.

As can be seen from the data of the Examples and FIGS. 1 and 2, surprisingly, the variations of CTE with MgO content are linear. This provides an advantageous method of lowering CTE in a given alkali-containing glass, e.g., by replacing alkali content by MgO. Furthermore, as can be seen from the data of the Examples and FIG. 3, surprisingly, as MgO content is increased in a glass composition, a maximum in thermal conductivity is achieved (e.g., at a MgO content of about 10 mole %). Further increases in MgO content have little effect on $K_{90° C}$. Thus, one method for adjusting the properties of a given alkali-containing glass to desired values comprises optimizing the combination of $K_{90° C}$ and CTE values by adjusting the MgO content to at least a value at which further MgO additions have substantially no effect on increasing $K_{90° c}$, and decreasing alkali content to a sufficiently low content to obtain a CTE value sufficiently low, e.g., $<20 \times 10^{-7}/°C.$ (20-300° C.), and at the same time to a sufficiently high content to obtain desirable high values of lifetime, e.g., $>250$ μsec, and cross-section, e.g., $>3.5 \times 10^{-20}$ cm$^2$, e.g., for use in a high average power laser.

A further advantage of the glasses of this invention is their compatibility with current state-of-the-art manufacturing methods for phosphate laser glasses. The melting, refining, homogenizing and casting of these glasses can be accomplished using the current standard procedures employed by the glass industry. The highly thermal stress resistant glasses of this invention can be formed into slabs, rods, discs, and other shapes required by the laser community and others by conventional forming techniques well known in the glass industry. The resultant glasses are of high fracture toughness, high thermal conductivity, low thermal expansion, good cross section for stimulated emission, good fluorescence lifetime for excited state emission, and high optical quality and optical homogeneity even in large sizes of as much as 15 to 20 liters of produced glass, and are free of all inclusions which can absorb or scatter laser radiation. Optical elements of these glasses can thus be fabricated utilizing standard procedures for cutting, grinding and polishing optical glass.

The alkali-containing glasses of this invention are also very amenable to conventional chemical strengthening because of the presence therein of significant amounts of smaller alkali metals, typically Li but also Na in accordance with the foregoing. When sodium or lithium are present in a glass at levels greater than about 6 wt. %, chemical strengthening of resultant glass articles is possible by a fully conventional procedure known as ion exchange. In this procedure, a surface compression layer is created over the glass article in such a way that to fracture the glass article a tensile force greater than the sum of the original failure strength plus the extra surface compression from chemical strengthening must be exceeded. In this way the strengthened glass articles can be operated under conditions of higher thermal loading without component failure.

The glasses of this invention can be fully conventionally prepared by mixing the appropriate amounts of each constituent in a batch which is then charged into a fused silica crucible and melted by induction heating from, e.g., 1100° C to as much as 1500 C depending on the chosen composition. The glass can then be refined at temperatures exceeding, e.g., 1300 C from typically 2 to 4 hours, again depending on composition and thus melt viscosity, with equal intervals of gas bubbling and stirring. The glass typically is then cast into steel molds and annealed at the transformation temperature plus about 20° C for about 2 hours, followed by cooling at about 30° C/hour. These procedures were followed in the examples below.

As noted above, the examples of this application are melted in a fused silica crucible. Under such melting conditions, as is well known, there will be some silica added from the crucible to the final glass composition. Accordingly, whereas all compositions given in this disclosure refer to component contents as added to the batch as is conventional (batch compositions), where a fused silica crucible is employed, the final composition will contain some silica. This conventional difference from the initial batch composition is analogous to other differences between final glass compositions and batch compositions, e.g., due to volatilization of ingredients, etc. For this invention, the additional amount of silica over and above the amount included in the batch composition will typically be no more than about 3.5, 3, 2.5, 2, 1.5, 1, 0.5 mole %, etc., especially not more than about 3 mole %, and most especially not more than about 2 mole % (all on a renormalized basis). In a preferred aspect of this invention, there is no silica added to the batch composition and the final composition contains no more than 3 mole% silica, especially not more than 2 or 1 mole % silica (on the mentioned basis) due to the effect of silica melting from the crucible. Of course, where a nonsilica-containing crucible is employed, this effect will not occur. The silica contribution from the crucible will vary conventionally with melt temperature and melting time. For example, for a melt time of about 2 hours at a temperature of about 1300.C, about 2 wt. % of silica will be contributed from a quartz crucible, the precise amount being determined by the precise conditions involved, such as glass volume exposed, crucible surface area, glass composition, degree of agitation of the melt, etc.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius and, unless otherwise indicated, all parts and percentages are by weight.

The entire texts of all applications, patents and publications, cited above and below, are hereby incorporated by reference.

EXAMPLES

It will be noted that several or the examples achieve properties falling outside the scope of this invention. These examples thus demonstrate the importance of certain factors discussed above in achieving the properties of this invention and, most importantly, provide valuable guidance as to how routine experimentation may be utilized to select compositions within the general composition space defined for this invention which have the properties defined for this invention. Fully conventional consideration will, of course, be given by skilled workers in any study of these examples to the experimental errors involved in measuring the disclosed properties, e.g., ±4% for $K_{90^\circ C}$ and ±1% for $\alpha$.

TABLE 1

| | (Compositions in Mole Percent) | | | | |
|---|---|---|---|---|---|
| | 1 | 2 | 3 | 4 | 5 |
| $P_2O_5$ | 64.56 | 64.56 | 64.56 | 64.56 | 64.56 |
| $Al_2O_3$ | 12.46 | 12.46 | 12.46 | 12.46 | 12.46 |
| $Li_2O$ | 19.59 | 13.59 | 10.59 | 4.59 | |
| MgO | | 6.00 | 9.00 | 15.00 | 19.59 |
| $Nd_2O_3$ | 1.83 | 1.83 | 1.83 | 1.83 | 1.83 |
| $La_2O_3$ | 0.38 | 0.38 | 0.38 | 0.38 | 0.38 |
| $As_2O_3$ | 0.13 | 0.13 | 0.13 | 0.13 | 0.13 |
| Properties: | | | | | |
| $n_d$ | 1.534 | 1.533 | 1.532 | 1.524 | 1.510 |
| Sigma ($\times 10^{20}$ cm$^2$) | 4.05 | 3.99 | 4.02 | 3.76 | 3.58 |
| Lifetime ($\mu$sec) | 293 | 293 | 285 | 275 | 263 |
| Density (g/cm$^3$) | 2.64 | 2.65 | 2.64 | 2.63 | 2.58 |
| $K_{90^\circ C.}$ (W/mK) | 0.88 | 0.90 | 0.89 | 0.88 | 0.83 |

TABLE 1-continued

| | (Compositions in Mole Percent) | | | | |
|---|---|---|---|---|---|
| | 1 | 2 | 3 | 4 | 5 |
| CTE $\alpha_{20-300^\circ C.}$ ($\times 10^{-7}/^\circ$C.) | 92.0 | 82.2 | 83.6 | 70.4 | 61.3 |
| E ($\times 10^3$ N/mm$^2$) | 72 | 75 | 74 | 73 | 66 |

TABLE 2

| | (Compositions in Mole Percent) | | | | | | | |
|---|---|---|---|---|---|---|---|---|
| | 6 | 7 | 8 | 9 | 10 | 11 | 12 | 13 |
| $P_2O_5$ | 61.27 | 61.27 | 61.27 | 61.27 | 61.27 | 61.27 | 61.27 | 61.27 |
| $Al_2O_3$ | 11.83 | 11.83 | 11.83 | 11.83 | 11.83 | 11.83 | 11.83 | 11.83 |
| $Li_2O$ | 24.59 | 21.59 | 18.59 | 15.59 | 12.59 | 9.59 | 6.59 | |
| MgO | | 3.00 | 6.00 | 9.00 | 12.00 | 15.00 | 18.00 | 24.59 |
| $Nd_2O_3$ | 1.74 | 1.74 | 1.74 | 1.74 | 1.74 | 1.74 | 1.74 | 1.74 |
| $La_2O_3$ | 0.36 | 0.36 | 0.36 | 0.36 | 0.36 | 0.36 | 0.36 | 0.36 |
| $As_2O_3$ | 0.12 | 0.12 | 0.12 | 0.12 | 0.12 | 0.12 | 0.12 | 0.12 |
| Properties: | | | | | | | | |
| $n_d$ | 1.533 | 1.534 | 1.533 | 1.542 | 1.530 | 1.527 | 1.523 | 1.506 |
| Sigma ($\times 10^{20}$ cm$^2$) | 4.23 | 4.15 | 4.10 | 4.01 | 4.02 | 3.95 | 3.84 | 3.58 |
| Lifetime ($\mu$sec) | 292 | 273 | 302 | 275 | 271 | 276 | 268 | 274 |
| Density (g/cm$^3$) | 2.62 | 2.62 | 2.63 | 2.63 | 2.64 | 2.63 | 2.62 | 2.55 |
| $K_{90^\circ C.}$ (W/mk) | 0.85 | 0.87 | 0.86 | 0.87 | 0.87 | 0.87 | 0.87 | 0.81 |
| CTE $\alpha_{20-300^\circ C.}$ ($\times 10^{-7}/^\circ$C.) | 98.4 | 94.7 | 92.3 | 86.5 | 83.9 | 76.9 | 72.1 | 58.1 |
| E ($\times 10^3$ N/mm$^2$) | 70 | 71 | 73 | 74 | 73 | 73 | 71 | 62 |

TABLE 3

| | (Compositions in Mole Percent) | | | |
|---|---|---|---|---|
| | 14 | 15 | 16 | 17 |
| $P_2O_5$ | 59.21 | 59.21 | 59.21 | 59.21 |
| $Al_2O_3$ | 11.43 | 11.43 | 11.43 | 11.43 |
| $Li_2O$ | 27.05 | 21.05 | 18.05 | 12.05 |
| MgO | | 6.00 | 9.00 | 15.00 |
| $Nd_2O_3$ | 1.74 | 1.74 | 1.74 | 1.74 |
| $La_2O_3$ | 0.36 | 0.36 | 0.36 | 0.36 |
| $As_2O_3$ | 0.12 | 0.12 | 0.12 | 0.12 |
| Properties: | | | | |
| $n_d$ | 1.534 | 1.533 | 1.533 | 1.528 |
| Sigma ($\times 10^{20}$ cm$^2$) | 4.25 | 4.34 | 4.11 | 3.98 |
| Lifetime ($\mu$sec) | 273 | 246 | 263 | 253 |
| Density (g/cm$^3$) | 2.63 | 2.64 | 2.64 | 2.64 |
| $K_{90^\circ C.}$ (W/mK) | 0.82 | 0.87 | 0.88 | 0.83 |
| CTE $\alpha_{20-300^\circ C.}$ ($\times 10^{-7}/^\circ$C.) | 103.4 | 93.8 | 90.2 | 82.7 |
| E ($\times 10^3$ N/mm$^2$) | 70 | 72 | 73 | 72 |

TABLE 4

| | (Compositions in Mole Percent) | | | |
|---|---|---|---|---|
| | 18 | 19 | 20 | 21 |
| $P_2O_5$ | 57.15 | 57.15 | 57.15 | 57.15 |
| $Al_2O_3$ | 11.03 | 11.03 | 11.03 | 11.03 |
| $Li_2O$ | 29.51 | 23.51 | 20.51 | 14.51 |
| MgO | | 6.00 | 9.00 | 15.006 |
| $Nd_2O_3$ | 1.74 | 1.74 | 1.74 | 1.74 |
| $La_2O_3$ | 0.36 | 0.36 | 0.36 | 0.36 |
| $As_2O_3$ | 0.12 | 0.12 | 0.12 | 0.12 |
| Properties: | | | | |
| $n_d$ | 1.535 | 1.534 | 1.533 | 1.529 |
| Sigma ($\times 10^{20}$ cm$^2$) | 4.29 | 4.22 | 4.22 | 3.99 |
| Lifetime ($\mu$sec) | 248 | 254 | 237 | 240 |
| Density (g/cm$^3$) | 2.63 | 2.64 | 2.64 | 2.64 |
| $K_{90^\circ C.}$ (W/mK) | 0.83 | 0.88 | 0.88 | 0.83 |
| CTE $\alpha_{20-300^\circ C.}$ ($\times 10^{-7}/^\circ$C.) | 104.2 | 97.8 | 94.6 | 87.1 |
| E ($\times 10^3$ N/mm$^2$) | 70 | 72 | 73 | 72 |

TABLE 5

| | (Compositions in Mole Percent) | | | | |
|---|---|---|---|---|---|
| | 22 | 23 | 24 | 25 | 26 |
| $P_2O_5$ | 61.27 | 61.27 | 61.27 | 61.27 | 61.27 |
| $Al_2O_3$ | 11.83 | 11.83 | 11.83 | 11.83 | 11.83 |

TABLE 5-continued

| (Compositions in Mole Percent) | | | | | |
|---|---|---|---|---|---|
| | 22 | 23 | 24 | 25 | 26 |
| Na$_2$O | 24.59 | 21.30 | 18.59 | 15.59 | 12.59 |
| MgO | | 3.00 | 6.00 | 9.00 | 12.00 |
| Nd$_2$O$_3$ | 1.74 | 1.74 | 1.74 | 1.74 | 1.74 |
| La$_2$O$_3$ | 0.36 | 0.36 | 0.36 | 0.36 | 0.36 |
| As$_2$O$_3$ | 0.12 | 0.12 | 0.12 | 0.12 | 0.12 |
| Properties: | | | | | |
| n$_d$ | 1.518 | 1.519 | 1.522 | 1.524 | 1.525 |
| Sigma ($\times 10^{20}$ cm$^2$) | 4.06 | 3.99 | 3.86 | 4.01 | 4.32 |
| Lifetime ($\mu$sec) | 330 | 300 | 240 | 269 | 289 |
| Density (g/cm$^3$) | 2.68 | 2.68 | 2.69 | 2.68 | 2.68 |
| K$_{90°\,C.}$ (W/mK) | 0.72 | 0.73 | 0.76 | 0.79 | 0.77 |
| CTE $\alpha_{20\text{-}300°\,C.}$ ($\times 10^{-7}/°C.$) | 120 | 112.6 | 104.0 | 99.5 | 90.2 |
| E ($\times 10^3$ N/mm$^2$) | 59 | 61 | 65 | 67 | 69 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A low- or no-silica phosphate glass useful as a high average power laser medium and having a high thermal conductivity, $K_{90°\,C} > 0.8$ W/mK, and a low coefficient of thermal expansion, $\alpha_{20°\text{-}300°\,C} < 90 \times 10^{-7}/°C$, consisting essentially of (on a batch composition basis):

| | Mole % |
|---|---|
| P$_2$O$_5$ | 45–70 |
| Li$_2$O | 0–14 |
| Na$_2$O | 0–12 |
| K$_2$O | 0–6 |
| Al$_2$O$_3$ | 9–15 |
| lasable ion-containing oxide | 0.01–6 |
| La$_2$O$_3$ | 0–6 |
| SiO$_2$ | 0–8 |
| B$_2$O$_3$ | 0–8 |
| MgO | 6–30 |
| CaO | 0–15 |
| SrO | 0–9 |
| BaO | 0–9 |
| ZnO | 0–15 |
| Σ MgO + Li$_2$O | 20–30 | whereby said glass has $K_{90°\,C} > 0.8$ W/mK and $\alpha_{20\text{-}300°\,C} < 90 \times 10^{-7}/°C$,
and wherein, when the batch composition is melted in contact with a silica-containing surface, the final glass composition contains at most about 3.5 mole % of additional silica derived from such contact during melting.

2. A glass of claim 1, wherein said lasable ion is a lanthanide.

3. A glass of claim 2, further containing an amount of La$_2$O$_3$ replacing a portion of said amount of said lasable ion.

4. A glass of claim 2, wherein said lasable ion is Nd.

5. A glass of claim 2, consisting essentially of (on a batch composition basis):

| | Mole % |
|---|---|
| P$_2$O$_5$ | 45–70 |
| Li$_2$O | 0–12 |
| Na$_2$O | 0–10 |
| K$_2$O | 0–3 |
| Al$_2$O$_3$ | 10–15 |
| Nd$_2$O$_3$ | 0.01–6 |
| La$_2$O$_3$ | 0–6 |
| SiO$_2$ | 0–8 |
| B$_2$O$_3$ | 0–8 |
| MgO | 8–24 |
| CaO | 0–15 |
| SrO | 0–9 |
| BaO | 0–9 |
| ZnO | 0–15 |
| Σ MgO + Li$_2$O | 20–30 |

6. A glass of claim 2, consisting essentially of (on a batch composition basis):

| | Mole % |
|---|---|
| P$_2$O$_5$ | 50–65 |
| Li$_2$O | 0–12 |
| Na$_2$O | 0–5 |
| K$_2$O | 0 |
| Al$_2$O$_3$ | 10–15 |
| Nd$_2$O$_3$ | 0.01–6 |
| La$_2$O$_3$ | 0–6 |
| SiO$_2$ | 0 |
| B$_2$O$_3$ | 0–5 |
| MgO | 10–18 |
| CaO | 0–12 |
| SrO | 0–6 |
| BaO | 0–6 |
| ZnO | 0–12 |
| Σ MgO + Li$_2$O | 20–30 |

7. A glass of claim 2, consisting essentially of (on a batch composition basis):

| | Mole % |
|---|---|
| P$_2$O$_5$ | 55–65 |
| Li$_2$O | 2–10 |
| Na$_2$O | 0 |
| K$_2$O | 0 |
| Al$_2$O$_3$ | 10–15 |
| Nd$_2$O$_3$ | 0.01–6 |
| La$_2$O$_3$ | 0–6 |
| SiO$_2$ | 0 |
| B$_2$O$_3$ | 0 |
| MgO | 10–18 |
| CaO | 0–9 |
| SrO | 0–4 |
| BaO | 0–4 |
| ZnO | 0–9 |
| Σ MgO + Li$_2$O | 20–30 |

8. A glass of claim 5, wherein $K_{90°\,C} \geq 0.85$ and $\alpha_{20\text{-}300°\,C} < 85$.

9. A glass of claim 5, wherein the content of Li$_2$O is 2–10 mole %.

10. A glass of claim 1 containing essentially no SiO$_2$ in the batch composition.

11. A glass of claim 5 containing essentially no SiO$_2$ in the batch composition.

12. A glass of claim 1 further containing an effective amount of a refining agent or another batch component effective as a solarization inhibitor, excluding SiO$_2$.

13. A glass of claim 5 further containing an amount of K$_2$O less than about 6 mole % which does not result in $K_{90°C}$ or $\alpha_{20-300°C}$ failing to meet said quantitative values.

14. A glass of claim 1 containing essentially no alkali metal oxides other than $Li_2O$.

15. A glass of claim 5 containing essentially no alkali metal oxides other than $Li_2O$.

16. A glass of claim 10 containing essentially no alkali metal oxides other than $Li_2O$.

17. A glass of claim 5 containing essentially no alkali metal oxides other than $Li_2O$ and essentially no $SiO_2$ in the batch composition.

18. A glass of claim 1, wherein said lasable ion is Tm, Yb, Dy, Pm, Tb, Er, Ho, Ti, V, Cr, Eu, or Sm.

19. A glass of claim 1 which further contains an amount of a transition metal or lanthanide dopant ion effective to transfer energy to said lasable ion.

20. In a high average power laser comprising a cavity having an active glass component and reflective end surfaces, the improvement wherein said glass is one of claim 1.

21. A laser of claim 20, wherein said active glass component is chemically strengthened by ion exchange.

22. A low- or no-silica phosphate glass useful as a high average power laser medium and having a high thermal conductivity, $K_{90°C} > 0.8$ W/mK, and a low coefficient of thermal expansion, $\alpha_{20°-300°C} < 90 \times 10^{-7}/°C$, consisting essentially of (on a batch composition basis):

|  | Mole % |
|---|---|
| $P_2O_5$ | 45–70 |
| $Li_2O$ | 0–14 |
| $Na_2O$ | 0–12 |
| $K_2O$ | 0–6 |
| $Al_2O_3$ | 9–15 |
| lasable ion-containing oxide | 0–6 |
| $La_2O_3$ | 0–6 |
| $SiO_2$ | 0–8 |
| $B_2O_3$ | 0–8 |
| MgO | 6–30 |
| CaO | 0–15 |
| SrO | 0–9 |
| BaO | 0–9 |
| ZnO | 0–15 |
| $\Sigma$ MgO + $Li_2O$ | 20–30 | whereby said glass has $K_{90°C} \geq 0.8$ W/mK and $\alpha_{20-300°C} < 90 \times 10^{-7}/°C$, and wherein, when the batch composition is melted in contact with a silica-containing surface, the final glass composition contains at most about 3.5 mole % of additional silica derived from such contact during melting.

23. A glass of claim 1 containing essentially no $SiO_2$ in the batch composition and up to 3 mole % $SiO_2$ in the final glass composition.

24. A glass of claim 1 containing essentially no $SiO_2$ in the batch composition and up to 2 mole % $SiO_2$ in the final glass composition.

25. A glass of claim 1, melted in a non-$SiO_2$-containing crucible.

26. A glass of claim 1 containing in the batch composition 0–3 mole % of $K_2O$ and essentially no $SiO_2$.

27. A glass of claim 22 containing in the batch composition 0–3 mole % of $K_2O$ and essentially no $SiO_2$.

28. A glass of claim 1, having the following properties:

Damaging inclusions per liter essentially zero
Strengthenability $\geq 4x$
Young's Modulus $(E) < 72 \times 10^3$ 3 N/mm²
Poisson's Ratio $(\nu) < 0.230$
Cross section $(\sigma) > 3.5 \times 10^{-20}$ cm²
Fluorescence lifetime (5% Nd) $> 250$ μsec.

29. In an optical fiber comprising a core glass and a cladding glass, the improvement wherein the cladding glass is one of the claim 22.

30. A glass of claim 1 which has a value of $\alpha_{20°-300°C} < 85 \times 10^{-7}/°C$.

* * * * *

UNITED STATES PATENT AND TRADEMARK OFFICE
CERTIFICATE OF CORRECTION

PATENT NO. : 5,032,315
DATED : July 16, 1991
INVENTOR(S) : HAYDEN et al.

It is certified that error appears in the above-identified patent and that said Letters Patent is hereby corrected as shown below:

Col. 14, In the Claims - - -

CLAIM: 22

Line: 10

Reads - - - $K_{90°C}$ 22 0.8 W/mK and $\alpha_{20-300}$

Should read - - - -

$K_{90°C} > 0.8$ W/mK and $\alpha_{20-300}$

Signed and Sealed this

First Day of December, 1992

*Attest:*

DOUGLAS B. COMER

*Attesting Officer*     *Acting Commissioner of Patents and Trademarks*